US011474536B2

(12) United States Patent
Kim et al.

(10) Patent No.: US 11,474,536 B2
(45) Date of Patent: Oct. 18, 2022

(54) DRIVING SYSTEM FOR CONTROLLING AN AUTONOMOUS VEHICLE AND METHOD OF PREVENTING COLLISION AT CROSSING POSITION

(71) Applicant: SAMSUNG ELECTRONICS CO., LTD., Suwon-si (KR)

(72) Inventors: Byoung-Soo Kim, Yongin-si (KR); Hae-Joong Kim, Seongnam-si (KR); Kwang-Young Im, Suwon-si (KR); Ri Choe, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 212 days.

(21) Appl. No.: 16/397,364

(22) Filed: Apr. 29, 2019

(65) Prior Publication Data

US 2020/0150685 A1 May 14, 2020

(30) Foreign Application Priority Data

Nov. 9, 2018 (KR) .......................... 10-2018-0136967

(51) Int. Cl.
*G05D 1/02* (2020.01)
*G08G 1/16* (2006.01)

(52) U.S. Cl.
CPC .......... *G05D 1/0289* (2013.01); *G05D 1/0295* (2013.01); *G08G 1/161* (2013.01); *G08G 1/164* (2013.01); *G05D 2201/0216* (2013.01)

(58) Field of Classification Search
CPC ............... G05D 1/0289; G05D 1/0295; G05D 2201/0216; G05B 2219/2637;
(Continued)

(56) References Cited

U.S. PATENT DOCUMENTS 6,941,200 B2   9/2005   Sonoyama et al.
8,751,060 B2   6/2014   Kinoshita
(Continued)

FOREIGN PATENT DOCUMENTS

CN   103996312    8/2014
CN   204759760    11/2015
(Continued)

OTHER PUBLICATIONS

CN Office Action dated Jul. 8, 2022 in corresponding CN Appln. No. 201911096136.6.

*Primary Examiner* — Khoi H Tran
*Assistant Examiner* — Tanner L Cullen
(74) *Attorney, Agent, or Firm* — F. Chau & Associates, LLC

(57) ABSTRACT

A driving system includes a central controller, a plurality of driving paths forming a least crossing position, and a plurality of autonomous driving devices configured to drive along at least one of the driving paths through the crossing position. The central controller is configured to determine a plurality of target driving devices from among the autonomous driving devices that are within a certain range of the crossing position, designate one of the target driving devices as a master driving device and the other of the target driving device as slave driving devices. The master driving device controls passage of the slave driving devices through the crossing position.

19 Claims, 10 Drawing Sheets

(58) Field of Classification Search
CPC ...... G05B 19/042; G08G 1/161; G08G 1/164;
G08G 1/166; G08G 1/07
See application file for complete search history.

(56) References Cited

U.S. PATENT DOCUMENTS

| | | | |
|---|---|---|---|
| 8,768,545 B2 | 7/2014 | Ikeya | |
| 9,751,506 B2* | 9/2017 | Mudalige | G08G 1/166 |
| 9,758,308 B1 | 9/2017 | Nishikawa et al. | |
| 9,793,147 B2 | 10/2017 | Ryu et al. | |
| 10,056,280 B2 | 8/2018 | Ryu et al. | |
| 10,334,412 B1* | 6/2019 | Kenane | B60W 40/06 |
| 10,604,351 B2* | 3/2020 | Takahara | H01L 21/67715 |
| 10,872,379 B1* | 12/2020 | Nepomuceno | G08G 1/096775 |
| 2008/0277243 A1* | 11/2008 | Hayduchok | B61C 11/04 |
| | | | 198/463.6 |
| 2010/0256852 A1* | 10/2010 | Mudalige | G08G 1/164 |
| | | | 701/24 |
| 2013/0006513 A1 | 1/2013 | Nishiyama et al. | |
| 2013/0018572 A1* | 1/2013 | Jang | G08G 1/164 |
| | | | 701/119 |
| 2014/0129075 A1* | 5/2014 | Carleton | B60W 30/16 |
| | | | 701/27 |
| 2016/0185348 A1 | 6/2016 | Miura et al. | |
| 2017/0151944 A1* | 6/2017 | Al-Stouhi | B60W 10/18 |
| 2017/0283182 A1 | 10/2017 | Maejima et al. | |
| 2017/0341641 A1* | 11/2017 | Miller | B60W 30/18154 |
| 2018/0239361 A1 | 8/2018 | Micks et al. | |
| 2018/0267539 A1* | 9/2018 | Shih | G05D 1/0295 |
| 2020/0117193 A1* | 4/2020 | Zhou | G08G 1/166 |

FOREIGN PATENT DOCUMENTS

| | | |
|---|---|---|
| CN | 105741609 | 7/2016 |
| CN | 106873580 | 6/2017 |
| CN | 107274720 | 10/2017 |
| EP | 2211322 | 7/2010 |
| JP | 5-87606 | 4/1993 |
| JP | 2000-250627 | 9/2000 |
| JP | 2000-330633 | 11/2000 |
| KR | 10-1610209 | 4/2016 |
| KR | 10-2017-0030321 | 3/2017 |
| KR | 10-2017-0113029 | 10/2017 |

* cited by examiner

DRIVING SYSTEM FOR CONTROLLING AN AUTONOMOUS VEHICLE AND METHOD OF PREVENTING COLLISION AT CROSSING POSITION

CROSS-REFERENCE TO RELATED APPLICATION

This U.S. non-provisional application claims priority under 35 USC § 119 to Korean Patent Application No. 10-2018-0136967, filed on Nov. 9, 2018, in the Korean Intellectual Property Office (KIPO), the disclosure of which is incorporated by reference in its entirety herein.

BACKGROUND

1. Technical Field

Exemplary embodiments relate generally to autonomous systems, and more particularly to a driving system, an autonomous vehicle included in a driving system and a method of preventing a collision at a crossing position.

2. Discussion of Related Art

Autonomous vehicles or unmanned vehicles may be used to transport articles along fixed driving paths in a processing facility. For example, a facility for manufacturing semiconductor devices may include a driving system that controls a plurality autonomous driving devices along fixed driving paths to transport semiconductor wafers between processing apparatuses. As the facility is enlarged, the number of the processing apparatuses is increased and the connection structure of the driving paths becomes complicated. Also the number of the autonomous driving devices is increased and thus it becomes more difficult to prevent collisions.

SUMMARY

At least one exemplary embodiment of the inventive concept may provide a driving system capable of efficiently preventing a collision at crossing positions of driving paths, an autonomous driving device of the driving system and a method of preventing collisions at crossing positions.

According to an exemplary embodiment of the inventive concept, a driving system is provided including a central controller, a plurality driving paths forming a crossing position, and a plurality of autonomous driving devices configured to drive along at least one of the driving paths through the crossing position. The central controller is configured to determine a plurality of target driving devices from among the autonomous driving devices that are within a certain range of the crossing position, designate one of the target driving devices as a master driving device and the other of the target driving device as slave driving devices. The master driving device controls passage of the slave driving devices through the crossing position.

According to an exemplary embodiment of the inventive concept, an autonomous driving device is provided that includes an autonomous vehicle configured to drive along a plurality of driving paths forming a crossing position. The autonomous vehicle is configured to selectively operate as one of a master driving device and a slave driving device in response to receipt of a message from a central controller that is external to the autonomous vehicle. The autonomous vehicle operated as the master driving device controls passage through the crossing position by other autonomous vehicles operated as the slave driving device by performing local communications between the master driving device and the slave driving devices.

According to an exemplary embodiment of the inventive concept, a method of preventing a collision at a crossing position of a plurality of driving paths driven by a plurality of autonomous driving devices is provided. The method includes a central controller determining a plurality of target driving devices from the autonomous driving devices that are within a certain range of the crossing position; the central controller designating one of a plurality of the target driving devices as a master driving device and the others of the plurality of target driving devices as slave driving devices; and the master driving device controlling passage through the crossing position by the slave driving devices.

The driving system, the autonomous driving device and the method of preventing collision at the crossing position may reduce installation and management costs of the driving system and a facility including the driving system through the local communications between the autonomous driving devices without requiring additional hardware for preventing collisions.

In additions, the driving system, the autonomous driving device and the method of preventing collision at the crossing position may reduce the burden placed on the central controller for controlling operations because the central controller controls overall driving of the autonomous driving devices and the master driving device controls the passage through the crossing position.

BRIEF DESCRIPTION OF THE DRAWINGS

Exemplary embodiments of the present disclosure will be more clearly understood from the following detailed description taken in conjunction with the accompanying drawings.

DETAILED DESCRIPTION OF THE EXEMPLARY EMBODIMENTS

Figure 1:
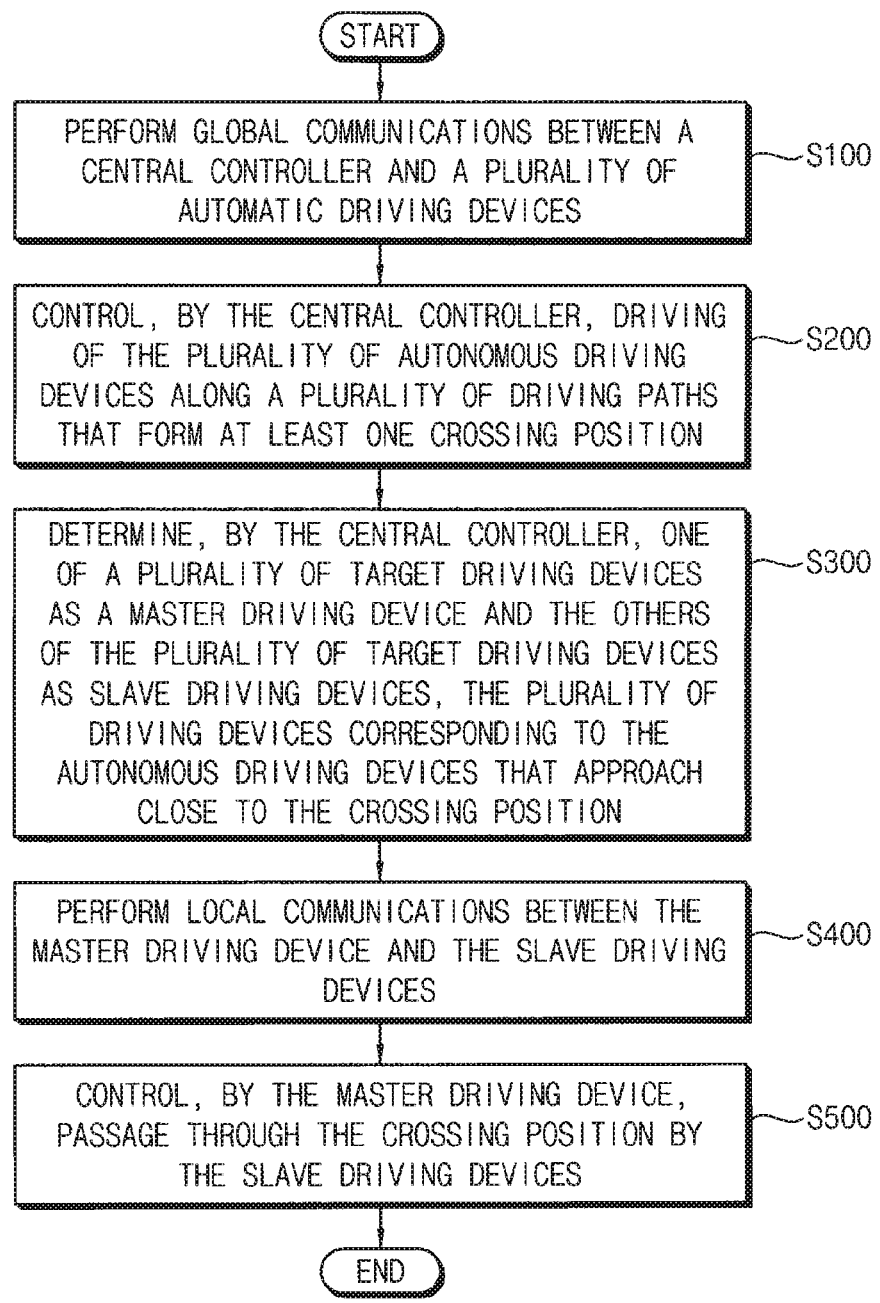
FIG. 1 is a flow chart illustrating a method for preventing a collision at a crossing position in a driving system according to exemplary embodiment of the inventive concept.

The inventive concept will be described more fully hereinafter with reference to the accompanying drawings, in which exemplary embodiments thereof are shown. In the drawings, like numerals refer to like elements throughout.

FIG. 1 is a flow chart illustrating a method of preventing collision at a crossing position (or a crossing point) in a driving system according to exemplary embodiment of the inventive concept.

Referring to FIG. 1, global communications are performed between a central controller and a plurality of autonomous driving devices (S100). An autonomous driving device may be an unmanned vehicle capable of driving itself across land (e.g., on rails, wheels, etc.). For example, the autonomous driving device may be capable of driving itself without a human pilot steering. The global communications may be implemented with a wired communication, a wireless communication or a combination of the wired and wireless communications. In at least one exemplary embodiment, the plurality of autonomous driving devices perform only the wireless communications. In this case, the driving system may further include relay stations distributed in the driving system to support the communications between the central controller and the plurality of autonomous driving devices. The relay stations may communicate with the central controller wirelessly or using a local area network (LAN). In an embodiment, each of relay stations includes a transceiver to communicate with the central controller.

The central controller controls driving of the plurality of autonomous driving devices along a plurality of driving paths that form at least one crossing position (S200). In an exemplary embodiment, at least one or each of the plurality of autonomous driving devices provide its own state information to the central controller through global communications. The state information may include a present position or a present speed of the corresponding driving device. The central controller may manage an entire driving schedule of the autonomous driving devices included in the driving system and may transmit driving commands to the respective autonomous driving devices through the global communications. Each autonomous driving device may select a driving path based on the driving commands transmitted from the central controller and drive to a destination along the selected driving path.

The central controller determines one of a plurality of target driving devices as a master driving device and the others of the plurality of target driving devices as slave driving devices, where the plurality of target driving devices correspond to the autonomous driving devices that approach close to the crossing position (S300). For example, the target driving devices may be within a certain range of the crossing position.

The determination of the target driving devices and the determination of the master driving device may be implemented variously according to exemplary embodiments. In some exemplary embodiments, as will be described below with reference to FIG. 2, a collision risk region CRRG and a collision attention region CARG are set with respect to each crossing position and the target driving devices and the master driving device are determined based on the collision risk region CRRG and the collision attention region CARG.

Local communications are performed between the master driving device and the slave driving devices (S400). The local communications may be implemented with a wired communication, a wireless communication or a combination of the wired and wireless communications. In at least one exemplary embodiment, the plurality of autonomous driving devices perform only the wireless communications. In this case, the local communications between master driving device and the slave driving devices may be performed wirelessly.

The master driving device controls passage through the crossing position by the slave driving devices (S500). Whereas the determinations of the master driving device and the slave driving devices are determined by the central controller through the global communications, once the master driving device is determined, the passage through the crossing position is controlled by the master driving device.

In certain schemes, the collision prevention and driving control are implemented by additional devices such as a sensor and/or a management processor to control entrance and exit of the autonomous driving device for each crossing position. However, such schemes have complicated configurations, are difficult to maintain and repair and productivity may be degraded by delay of recovery when failure of the driving system occurs.

At least one embodiment of the inventive concept provides a driving system, autonomous driving devices and a method of preventing collision at a crossing position that may reduce installation and management costs of the driving system and a facility including the driving system through local communications between the autonomous driving devices by controlling the passages through the crossing position by the autonomous driving devices without additional hardware for preventing collisions.

At least one embodiment of the inventive concept provides a driving system, autonomous driving devices and a method of preventing collision at a crossing position that may reduce the burden placed on the central controller to perform control operation because the central controller controls overall driving of the autonomous driving devices and the master autonomous driving device controls the passage through the crossing position.

Hereinafter, for convenience of illustration and description, exemplary embodiments are described based on a merging position at which two driving paths merge to one path but the inventive concept is not limited thereto. For example, exemplary embodiments of the inventive concept may also be applied to prevent collisions at a diverging position where one path diverges into two paths along a driving direction and an arbitrary crossing position where a plurality of driving paths diverge and then diverge to another plurality of driving paths, in addition to the merging position.

Figure 2:
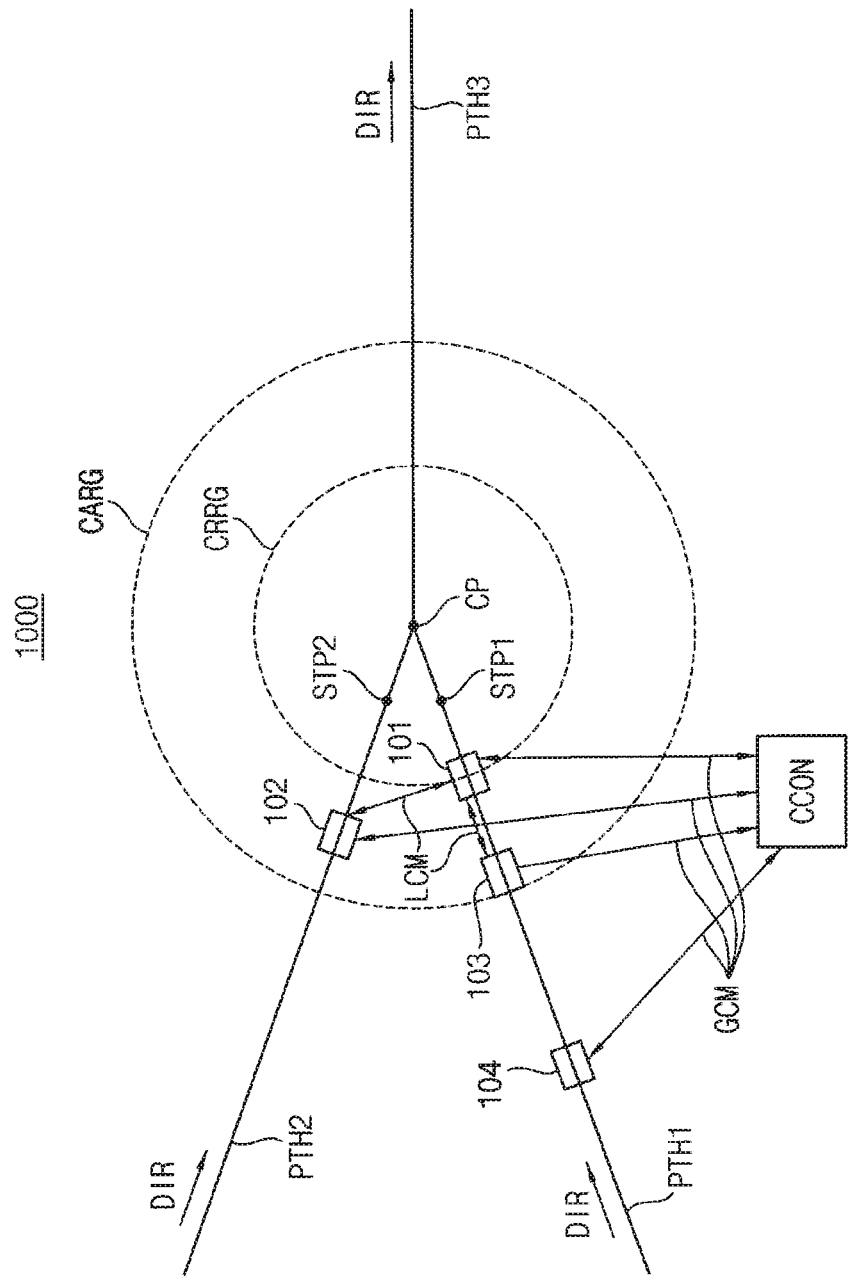
FIG. 2 is a diagram illustrating a schematic structure of a driving system according to an exemplary embodiment of the inventive concept.

FIG. 2 is a diagram illustrating a schematic structure of a driving system according to an exemplary embodiment of the inventive concept.

Referring to FIG. 2, a driving system 1000 includes a central controller CCON, a plurality of driving paths, for example, a first driving path PTH1, a second driving path PTH2 and a third driving path PTH3, and a plurality of autonomous driving devices, for example, a first autonomous driving device 101, a second autonomous driving device 102, a third autonomous driving device 103 and a fourth autonomous driving device 104.

Each of the first through fourth autonomous driving devices 101~104 may perform global communications GCM with the central controller CCON and drives along the first through third driving paths PTH1~PTH3 under control of the central controller CCON.

In the example of FIG. 2, the first, third and fourth autonomous driving devices 101, 103 and 104 drive in the driving direction along the first and third driving paths PTH1 and PTH3, and the second autonomous driving device 102 drives in the driving direction along the second and third driving paths PTH2 and PTH3.

Each of the first through fourth autonomous driving devices 101~104 may operate as one of a master driving device and a slave driving device when approaching close to the crossing position CP based on the determination of the central controller CCON. An autonomous driving device may be considered close to the crossing position CP when it is less than a pre-defined distance from the crossing position CP or within a pre-determined area centered at the crossing position CP.

In an exemplary embodiment, the central controller CCON stores crossing position information including an identifier of the crossing position CP and information on a collision risk region CRRG centered on the crossing position CP and a collision attention region CARG including the collision risk region CRRG and wider than the collision risk region CRRG. The collision attention region CARG may also be centered on the crossing position CP. The crossing position information CP may indicate coordinates of the crossing position CP. Even though one crossing position CP is illustrated in FIG. 2, the driving system 1000 may include a plurality of crossing positions, and the central controller CCON may store a plurality of crossing position information corresponding to the plurality of crossing positions, respectively.

In an exemplary embodiment, among a plurality of target driving devices corresponding to the autonomous driving devices that enter the collision attention region CARG, the central controller CCON determines the target driving device firstly entering the collision risk region CRRG as the master driving device and determines the other target driving devices as the slave driving devices.

In the example of FIG. 2, the first, second and third autonomous driving devices 101, 102 and 103 that enter the collision attention region CARG are determined as the target driving devices, and the fourth autonomous driving device 104 is not a target driving device because the fourth autonomous driving device 104 has not entered the collision attention region CARG yet.

In the example of FIG. 2, the central controller CCON may determine the first autonomous driving device 101 firstly entering the collision risk region CRRG as the master driving device and determine the other target driving devices, that is, the second and third autonomous driving devices 102 and 103 as the slave driving devices.

The autonomous driving device determined as the master driving device may control passage through the crossing position CP by the autonomous driving devices determined as the slave driving devices by performing the local communications LCM between the master driving device and the slave driving devices.

In the example of FIG. 2, the first autonomous driving device 101 determined as the master driving device may control the passage through the crossing position CP by the second and third autonomous driving devices 102 and 103 through the local communications LCM with the second and third autonomous driving devices 102 and 103. Even though FIG. 2 illustrates the local communications LCM as a device-to-device communication scheme, the local communications LCM may be implemented variously. In at least one exemplary embodiment, the local communications LCM is implemented as a broadcasting scheme where one autonomous driving device corresponding to a transmitter issues signals or messages to other autonomous driving devices corresponding to receivers. In an exemplary embodiment, each of the autonomous driving device includes a transceiver that enables the driving devices to send and receive signals or messages from one another.

In at least one exemplary embodiment, the master driving device passes through the crossing position CP before the slave driving devices, and the slave driving devices wait at stop positions STP1 and STP2 in the collision risk region CRRG until each of the slave driving devices is determined as a new master driving device.

In the example of FIG. 2, the second autonomous driving device 102 determined as the slave driving device waits at the stop position STP2 before the first autonomous driving device determined as the master driving device passes through the crossing position CP and exits the collision risk region CRRG. In an exemplary embodiment, the central controller CCON sets one of the existing slaving driving devices to be the new master driving device when it determines that the current master driving device has exited from the collision risk region CRRG. In an embodiment, the central controller CCON selects one of the existing slave driving devices that is closest to the crossing position CP to be the new master driving device. In an embodiment, the central controller CCON selects one of the existing slave driving devices that is predicted to reach the crossing position CP soonest to be the new master driving device. Then, the new master driving device resumes its drive towards the crossing position CP. In an exemplary embodiment, each of the driving paths PTH1, PTH2 and PTH3 is a no-passing lane to prevent the third autonomous driving device 103 from passing through the crossing position CP before the first autonomous driving device 101. In an embodiment, the no-passing lane is a rail or too narrow to prevent a driving device from passing another driving device.

Figure 3:
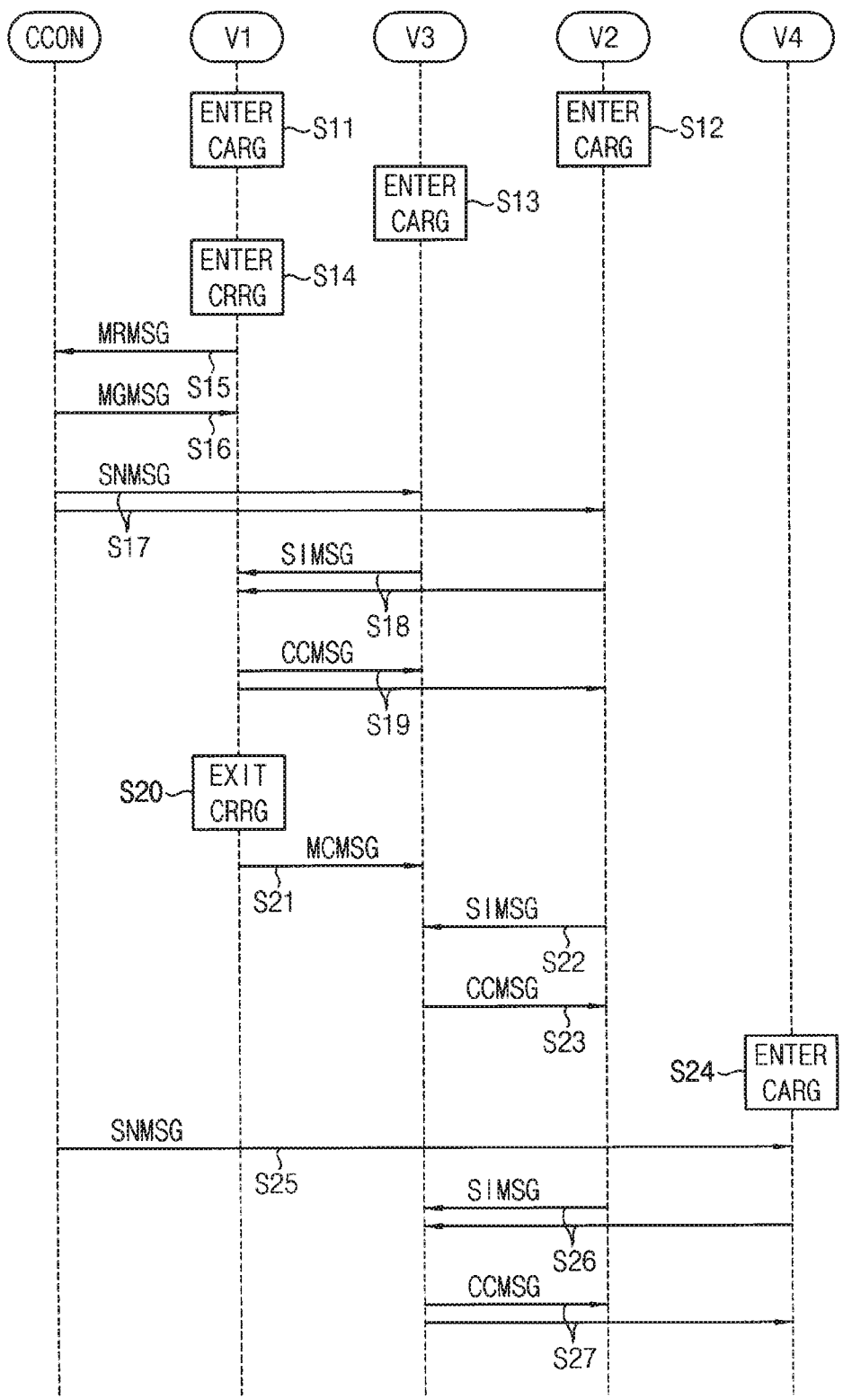
FIG. 3 is a diagram illustrating exemplary communication in a driving system according to an exemplary embodiment of the inventive concept.
Figure 4A:
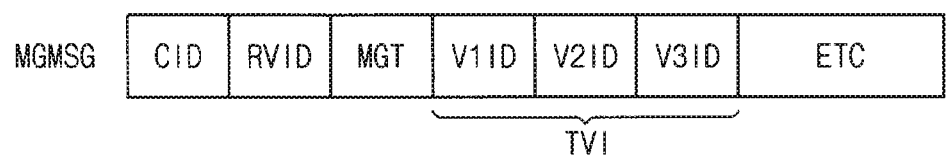
FIGS. 4A, 4B and 4C are diagrams illustrating exemplary messages used in a driving system according to an exemplary embodiment of the inventive concept.
Figure 4B:
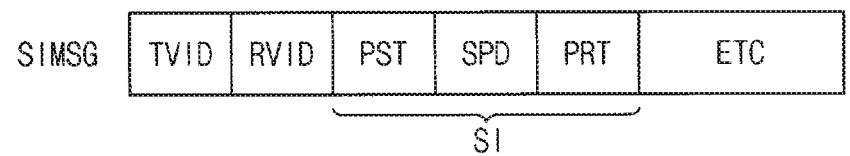
Figure 4C:
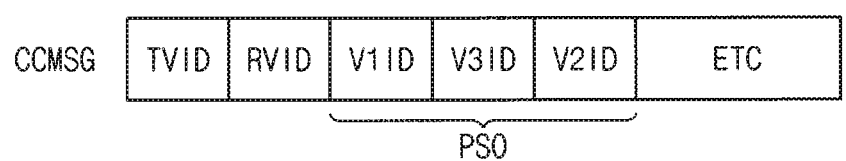

FIG. 3 is a diagram illustrating exemplary communication in a driving system according to an exemplary embodiment of the inventive concept, and FIGS. 4A, 4B and 4C are diagrams illustrating exemplary messages used in a driving system according to an exemplary embodiment of the inventive concept.

Referring to FIG. 3, a first autonomous driving device V1, a second autonomous driving device V2 and a third autonomous driving device V3 sequentially enter a collision attention region CARG (S11, S12, S13).

After that, the first autonomous driving device V1 firstly enters a collision risk region CRRG (S14). At a time point when the first autonomous driving device V1 enters the collision risk region CRRG, the first autonomous driving device V1, the second autonomous driving device V2 and the third autonomous driving device V3 correspond to the above-described target driving devices. A central controller CCON may determine the target driving devices based on state information of the autonomous driving devices provided through the above-described global communications GCM, for example, periodically. For example, the autonomous driving devices V1-V3 may periodically provide their state information to the central controller CCON, where the central controller CCON performs a calculation on data of the received state information to determine which of the devices are to be considered target driving devices. Alternately, the autonomous driving devices V1-V3 store their state information in local storage, and the central controller CCON periodically retrieves the state information from the local storage of each of driving devices V1-V3.

When the first autonomous driving device V1 enters the collision risk region CRRG, the first autonomous driving device V1 transmits a master request message MRMSG requesting approval as the master driving device to the central controller CCON (S15). In an exemplary embodiment, each driving device includes sufficient circuitry to enable it to determine whether it has entered the collision risk region CRRG. For example, the circuitry may include a global positioning system (GPS), a radio frequency identifier (RFID) reader, or a barcode scanner/reader. For example, the GPS could be used to determine the present position of the driving device, which can be compared against the collision risk region CRRG to determine whether the driving device has entered the collision risk region CRRG. For example, the RFID reader could be used to determine whether the driving device has passed a RF beacon on or near its current driving path indicating that the driving device has entered the collision risk region CRRG. For example, the barcode scanner/reader could be used to scan a barcode on or near its current driving path that indicates the driving device has entered the collision risk region CRRG.

In response to the master request message MRMSG, the central controller CCON transmits a message indicating whether the first autonomous driving device V1 that transmits the master request message MRMSG is determined as the master driving device or not. As illustrated in FIG. 3, when a master driving device does not exist when the central controller CCON receives the master request message MRMSG, the central controller CCON transmits a master grant message MGMSG to the first autonomous driving device V1 that transmitted the master request message MRMSG. Even though not illustrated in FIG. 3, when the master driving device exists when the central controller CCON receives the master request message MRMSG, the central controller CCON may transmit a master reject message indicating disapproval as the master driving device to the autonomous driving device that transmitted the master request message MRMSG.

In an exemplary embodiment, as illustrated in FIG. 4A, the master grant message MGMSG includes an identifier CID of the central controller CCON transmitting the master grant message MGMSG, an identifier RVID of an autonomous driving device receiving the master grant message MGMSG, a master grant tag MGT indicating an approval as the master driving device, target driving device information TVI and other information ETC. For example, the other information ETC may include an identifier of the crossing position CP or time information of transmitting the master grant message MGMSG.

The master grant tag MGT may selectively have a first value indicating approval as the master driving device or a second value indicating disapproval as the master driving device. Using the master grant tag MGT, the master grant message MGMSG of FIG. 4A may be used also as the master not-grant message indicating disapproval as the master driving device.

The target driving device information TVI may include identifiers of the autonomous driving devices corresponding to the target driving devices at a time point when the central controller CCON transmits the master grant message MGMSG. In the example of FIG. 3, the identifier RVID receiving the master grant message MGMSG corresponds to an identifier V1ID of the first autonomous driving device V1, and the target driving device information TVI includes the identifier V1ID of the first autonomous driving device V1, an identifier V2ID of the second autonomous driving device V2 and an identifier V3ID of the third autonomous driving device V3.

As such, the central controller CCON may transfer the identifiers V2ID and V3ID of the second and third autonomous driving devices V2 and V3 corresponding to the slave driving devices to the first autonomous driving device V1 corresponding to the master driving device through the target driving device information TVI. The master driving device V1 may recognize the slave driving devices V2 and V3 based on the target driving device information TVI and control the passage through the crossing position CP by the slave driving devices V2 and V3.

In an exemplary embodiment, as illustrated in FIG. 3, the central controller CCON transmits a slave notice message SNMSG to the slave driving devices V2 and V3 (S17). In an alternate embodiment, the master driving device V1 transmits the slave notice message SNMSG to the slave driving devices V2 and V3. In response to the slave notice message SNMSG, the slave driving devices V2 and V3 operate as the slave driving device.

Each of the slave driving devices V2 and V3 may transmit a state information message SIMSG to the master driving device V1 (S18). In an exemplary embodiment, the slave driving devices V2 and V3 transmit the state information message SIMSG to the master driving device V1 periodically.

In an exemplary embodiment, as illustrated in FIG. 4B, the state information message SIMSG includes an identifier TVID of the driving device transmitting the state information message SIMSG, an identifier RVID of the autonomous driving device receiving the state information message SIMSG, state information SI and other information ETC. For example, the other information ETC may include an identifier of the crossing position CP or time information of transmitting the state information message SIMSG.

The state information SI may include a present position PST and a present speed SPD of the slave driving device transmitting the state information message SIMSG. The master driving device V1 may determine a passage order PSO through the crossing position CP by the master driving device V1 and the slave driving devices V2 and V3 based on the state information messages SIMSG from the slave driving devices V2 and V3.

In an exemplary embodiment, the state information SI further includes a priority PRT indicating a degree of driving urgency of the slave driving device transmitting the state information message SIMSG. The master driving device V1 may adjust the passage order PSO based on the priorities PRT of the slave driving devices V2 and V3. For example, even if slave driving device V2 is closer to the crossing point CP than slave device V3, if slave device V3 has a higher priority PRT, the master driving device V1 could adjust the passage order PSO so that slave driving device V3 passes the crossing point CP before slave driving device V2.

The master driving device V1 may transmit a crossing control message CCMSG including the passage order PSO to the slave driving devices V2 and V3 (S19).

In an exemplary embodiment, as illustrated in FIG. 4C, the crossing control message CCMSG includes an identifier TVID of the driving device transmitting the crossing control message CCMSG, an identifier RVID of the autonomous driving device receiving the crossing control message CCMSG, the passage order PSO and other information ETC. For example, the other information ETC may include an identifier of the crossing position CP or time information of transmitting the crossing control message CCMSG.

In the example of FIG. 4C, the passage order PSO may sequentially include the identifier V1ID of the first autonomous driving device V1, the identifier V3ID of the third autonomous driving device V3 and the identifier V2ID of the second autonomous driving device V2. The order of passing through the crossing position CP by the slave driving devices may be provided by the sequential order of the identifiers in the passage order PSO. In the above example, autonomous driving device V1 passes through the crossing point CP first, autonomous driving device V3 passes through the crossing point CP second, and autonomous driving device V2 passes through the crossing point CP third.

According to the passage order PSO of FIG. 4C, the first autonomous driving device V1 corresponds to the master driving device and the third autonomous driving device V3 corresponds to a next master driving device.

As described with reference to FIG. 2, the master driving device V1 may pass through the crossing position CP before the slave driving devices V2 and V3, and the slave driving devices may wait at stop positions STP1 and STP2 in the collision risk region CRRG until each of the slave driving devices is determined as a new master driving device. A method of passing through the crossing position CP by the master driving device will be described below with reference to FIG. 8.

The master driving device V1 may determine a next master driving device among the slave driving device V2 and V3. The master driving device V12 may transmit a master change message MCMSG to the next master driving device (S21), when the master driving device V1 exits the collision risk region CRRG (S20) or the master driving device V1 falls out of order. For example, the third autonomous driving device V3 may correspond to the next master driving device as described with reference to FIG. 4C. In an exemplary embodiment, the master driving device V1 falls out of order when another one of the slave driving devices passes the crossing point CP before the master driving device V1.

The next master driving device V3 may operate as a new master driving device in response to the master change message MCMSG. The change of the master driving device may be transferred to the other slave driving devices by various methods. For example, the master change message MCMSG may be transmitted also to the other slave driving device V2 by a broadcasting scheme, or the master change message MCMSG may be transferred to the central controller CCON and then the central controller CCON may notify the other slave driving device V2 of the change of the slave device V3 to a new master driving device.

The new master driving device V3 may, as described above, receive the state information message SIMSG from the slave driving device V2 (S22), determine the passage order PSO based on the state information message SIMSG, and transmit the crossing control message CCMSG including the passage order PSO to the slave driving device V2 (S23).

After that, a fourth autonomous driving device V4 may enter the collision attention region CARG (S24). The central controller CCON may determine the fourth autonomous driving device V4 as the target driving device. Because the master driving device V3 exists at a time point when the fourth autonomous driving device V4 enters the collision attention region CARG, the central controller CCON may transmit the slave notice message SNMSG to the fourth autonomous driving device V4 (V25). The fourth autonomous driving device V4 may operate as the slave driving device in response to the slave notice message SNMSG.

The new master driving device V3 may receive the state information messages SIMSG from the slave driving devices V2 and V4 (S26), determine the passage order PSO and transmit the crossing control message CCMSG including the passage order PSO to the slave driving devices V2 and V4 (S27).

Due to the above scheme, installation and management costs of the driving system and a facility including the driving system may be reduced through the local communications between the autonomous driving devices by controlling the passages through the crossing position by the autonomous driving devices without additional hardware for preventing collisions.

In an exemplary embodiment, the messages described with reference to FIGS. 3 through 4C may be transferred by a broadcasting scheme. In this case, the autonomous driving device receiving a broadcasted message may parse the message to extract the identifier of the autonomous driving device to receive the message and use the information in the message selectively based on the parsed identifier. For example, if a first driving device receives a message that is for a second driving device (i.e., the extracted identifier does not match the extractor's identity), the first driving device can ignore the received message.

Figure 5:
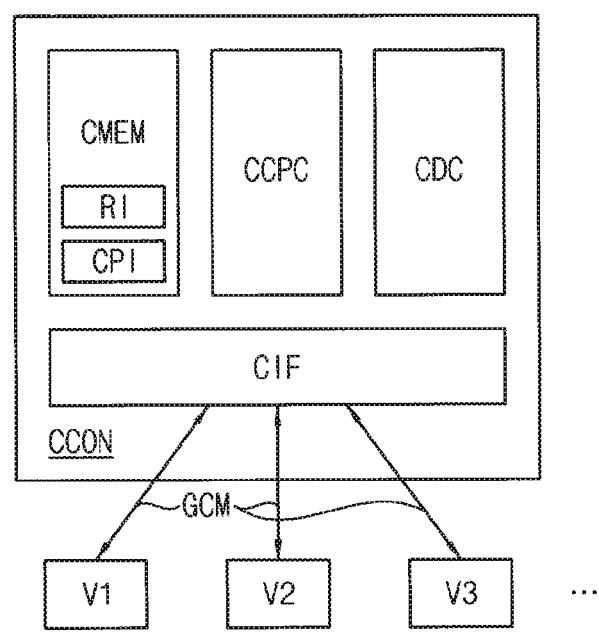
FIG. 5 is a block diagram illustrating a central controller included in a driving system according to an exemplary embodiment of the inventive concept.

FIG. 5 is a block diagram illustrating a central controller included in a driving system according to an exemplary embodiment of the inventive concept.

Referring to FIG. 5, a central controller CCON includes a central interface CIF (e.g., an interface circuit, a transceiver, etc.), a central memory CMEM, a central driving control unit CDC (e.g., a control circuit, a microprocessor, etc.) and a central crossing position CP control unit CCPC (e.g., a control circuit, a microprocessor, etc.).

The central interface CIF may perform global communications GCM with a plurality of autonomous driving devices V1, V2 and V3. As described above, the global communications GCM may be implemented with a wired communication, a wireless communication or a combination of the wired and wireless communications. In an exemplary embodiment, the plurality of autonomous driving devices V1, V2 and V3 perform only the wireless communications. In this case, the driving system may further include relay stations distributed in the driving system to support the communications between the central controller CCON and the plurality of autonomous driving devices V1, V2 and V3. The relay stations may communicate with the central controller CCON wirelessly or using a local area network (LAN).

The central memory CMEM may store path information RI and crossing position information CPI. The path information RI may include identifiers of the driving paths, positions of the driving paths, speed limits of the driving paths, and so on. The crossing position information CPI may include identifiers of the crossing positions and information on collision risk regions centered on the crossing positions and collision attention regions including the collision risk regions and wider than the collision risk regions, respectively. The central memory CMEM may further store information on the plurality of autonomous driving devices V1, V2 and V3.

The central driving control unit CDC may control driving of the plurality of autonomous driving devices V1, V2 and V3 through the global communications GCM. The central driving control unit CDC may determine optimum driving paths for the plurality of autonomous driving devices V1, V2 and V3 and transmit driving commands indicating the optimum paths to the plurality of autonomous driving devices V1, V2 and V3. In addition, the central driving control unit CDC may control restrictions of driving paths, change of the determined driving path, urgent brake in an emergency with respect to the plurality of autonomous driving devices V1, V2 and V3. For example, the central driving control unit CDC may maintain information indicating that certain driving paths cannot be used by certain driving devices. For example, if the central driving control unit CDC receives information that an emergency has occurred near a given driving device, the central driving control unit CDC can send a driving command to the given driving device informing the given driving device to come to a stop as soon as possible.

The central crossing position control unit CCPC may, among a plurality of target driving devices corresponding to the autonomous driving devices that enter the collision attention region, determine the target driving device firstly entering the collision risk region as the master driving device and determine the other target driving devices as the slave driving devices.

Figure 6:
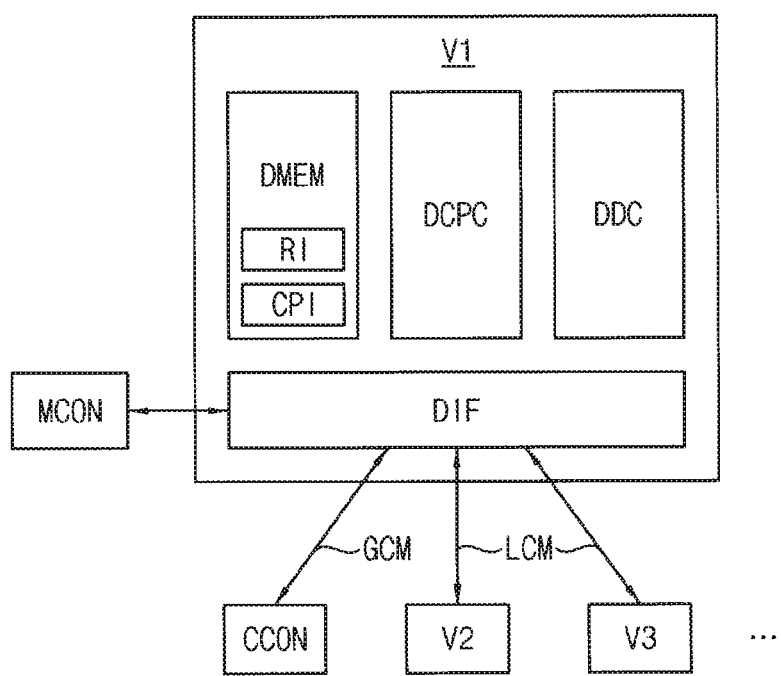
FIG. 6 is a block diagram illustrating an autonomous driving device included in a driving system according to an exemplary embodiment of the inventive concept.

FIG. 6 is a block diagram illustrating an autonomous driving device included in a driving system according to an exemplary embodiment of the inventive concept.

Referring to FIG. 6, each of first, second and third autonomous driving devices V1, V2 and V3 includes a device interface DIF (e.g., an interface circuit, a transceiver, etc.), a device memory DMEM, a device crossing position control unit DCPC (e.g., a control circuit, microprocessor, etc.) and a device driving control unit DDC (e.g., a control circuit, microprocessor, etc.). For convenience of illustration and description, the first autonomous driving device V1 is described with reference to FIG. 6, and the second and third autonomous driving devices V2 and V3 may have configurations similar to or equal to the first autonomous driving device V1.

The device interface DIF of the first autonomous driving device V1 may perform the global communications GCM with the central controller CCON and the local communications LCM with the other autonomous driving devices V2 and V3. The local communications LCM may be implemented with a wired communication, a wireless communication or a combination of the wired and wireless communications. In an exemplary embodiment, the plurality of autonomous driving devices V1, V2 and V3 perform only the wireless communications. In this case, the local communications between master driving device and the slave driving devices may be performed wirelessly.

The device memory DMEM may store the path information RI and the crossing position information CPI provided from the central controller CCON.

The device crossing position control unit DCPC may, when the first autonomous driving device V1 is determined as the master driving device, control the passage through a crossing position CP based on state information provided from the slave driving devices through the local communications LCM. In addition, the device crossing position control unit DCPC may, when the first autonomous driving device V1 is determined as the slave driving device, control the passage through the crossing position CP based on control of the master driving device through the local communications LCM.

The device driving control unit DDC may control driving along the plurality of driving paths under control of the central controller CCON and the crossing position control unit DCPC.

In an exemplary embodiment, the device crossing position control unit DCPC may, when the first autonomous driving device V1 is determined as the master driving device, transmit the determination result as the master driving device and a control command to the slave driving devices, and receive the state information of the slave driving devices to calculate a collision probability as a probability model. The determination of the collision possibility will be described below with reference to FIGS. 8 and 9.

The device crossing position control unit DCPC may, when the first autonomous driving device V1 is determined as the master driving device, determine a next master driving device based on the positions, the speeds, and the priorities of the slave driving devices. The device crossing position control unit DCPC may transmit the master change message MCMSG to the next master driving device as described above when the first autonomous driving device V1 exits the crossing position.

In some exemplary embodiments, as illustrated in FIG. 6, the driving system may further include a manual controller MCON (e.g., a control circuit, a microprocessor, etc.). The manual controller MCON may control the autonomous driving device out of order that is not controllable by the central controller CCON. Each of the plurality of autonomous driving devices V1, V2 and V3 may convert to a manual mode when each of the plurality of autonomous driving devices fall out of order. The autonomous driving device in the manual mode may operate under control of the manual controller MCON so that the autonomous driving device out of order may be removed rapidly from the driving paths and the loss due to failure may be minimized.

Even though not illustrated in figures, each of the autonomous driving devices V1, V2 and V3 may include a sensor to monitor a probability of collision with the preceding autonomous driving device on the same driving path, a sensor (e.g., a barcode scanner) to identify a tag such as a barcode indicating positions on the driving paths, a driving unit to perform driving of the autonomous driving device, loading and unloading of articles, a sensor control unit, a motion control unit, and so on.

According to an exemplary embodiment, the crossing position control unit DCPC may be implemented as software, hardware or a combination of software and hardware. When the crossing position control unit DCPC includes software, some embodiments of the present invention may be embodied as a method, a computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

Figure 7:
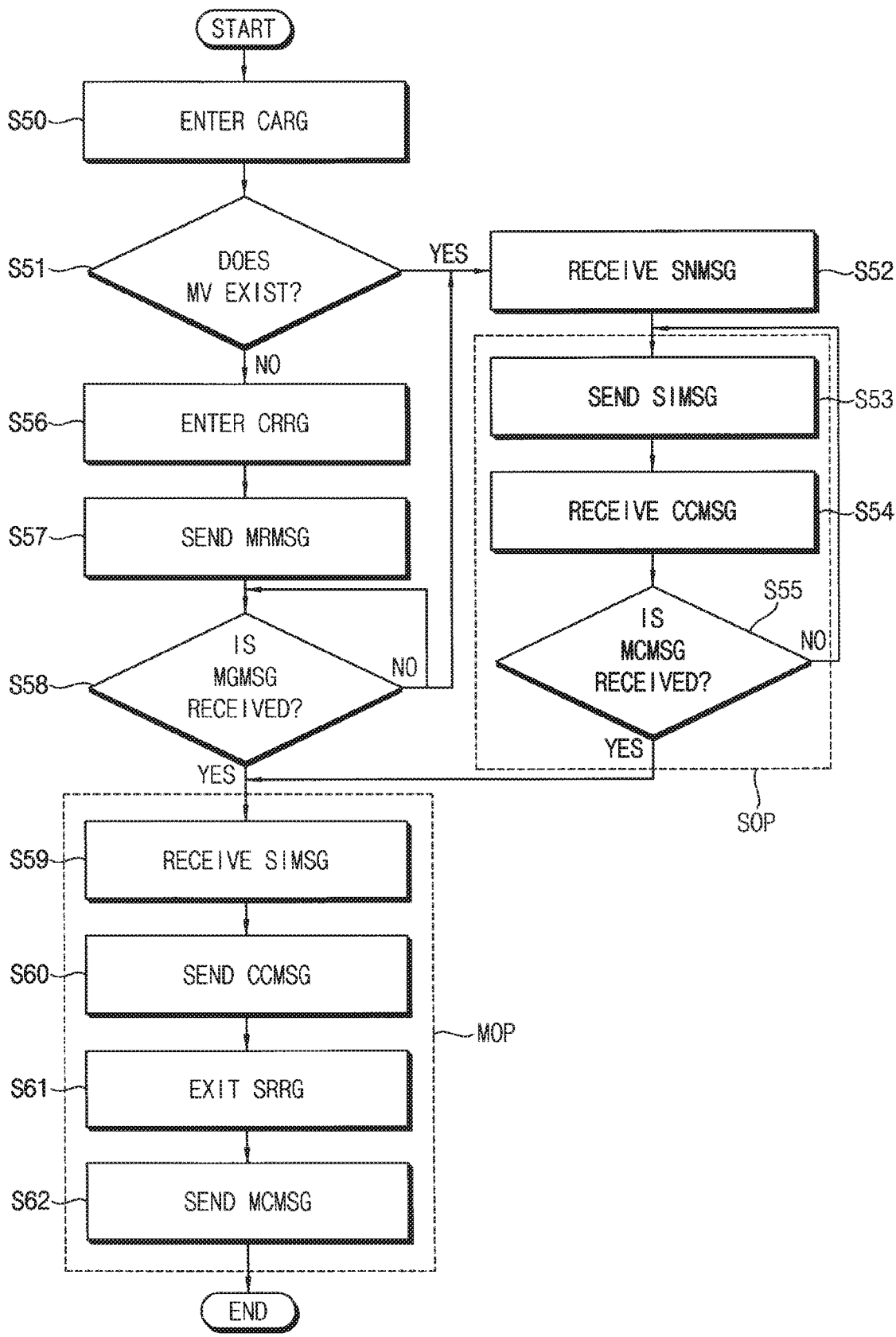
FIG. 7 is a flow chart illustrating an operation of an autonomous driving device according to an exemplary embodiment of the inventive concept.

FIG. 7 is a flow chart illustrating an operation of an autonomous driving device according to an exemplary embodiment of the inventive concept.

Referring to FIG. 7, when an autonomous driving device enters a collision attention region CARG (S50), an operation mode of the autonomous driving device is determined based on whether a master driving device MV exists (S51).

When the master driving device MV exists (S51: YES) at a time point when the autonomous driving device enters the collision attention region CARG, the autonomous driving device may receive a slave notice message SNMSG from a central controller CCON (S52) and perform operations SOP as the slave driving device in response to the slave notice message SNMSG.

The autonomous driving device determined as the slave driving device may transmit a state information message SIMSG to the master driving device (S53) and receive a crossing control message CCMSG from the master driving device (S54). Such local communications LCM between the slave driving device and the master driving device may be repeated until the slave driving device as a next master driving device receives a master change message MCMSG (S55: NO).

After entering the collision attention region CARG, the autonomous driving device may enter a collision risk region CRRG (S56) while the autonomous driving device is not determined as the slave driving device. In this case, the autonomous driving device may send or transmit a master request message MRMSG to the central controller CCON (S57). The autonomous driving device may standby until the autonomous driving device receives a master grant message MGMSG (S58: NO) or the autonomous driving device receives the slave notice message SNMSG (S53) to perform operations SOP as the slave driving device as described above.

When the autonomous driving device receives the master grant message (S58: YES) as the response to the master request message MRMSG, the autonomous driving device may perform operations MOP as the master driving device.

The autonomous driving device determined as the master driving device may receive the state information messages SIMSG from the slave driving devices (S59), determine a passage order PSO based on the state information messages SIMSG, and send a crossing control messages CCMSG including the passage order PSO to the slave driving devices (S60).

As described above, the autonomous driving device determined as the master driving device may pass through the crossing position before the slave driving devices, and each of the slave driving devices may wait at a stop position in the collision risk region CRRG until each of the slave driving devices is determined as a new master driving device.

When the autonomous driving device determined as the master driving device exits the collision risk region CRRG (S61), the autonomous driving device may send a master change message MCMSG to the next master driving device (S62) and finish the operations MOP as the master driving device.

The messages SNMSG, SIMSG, CCMSG, MRMSG, MGMSG and MCMSG may be the same as described with reference to FIGS. 3, 4A, 4B and 4C, and thus repeated descriptions are omitted.

Figure 8:
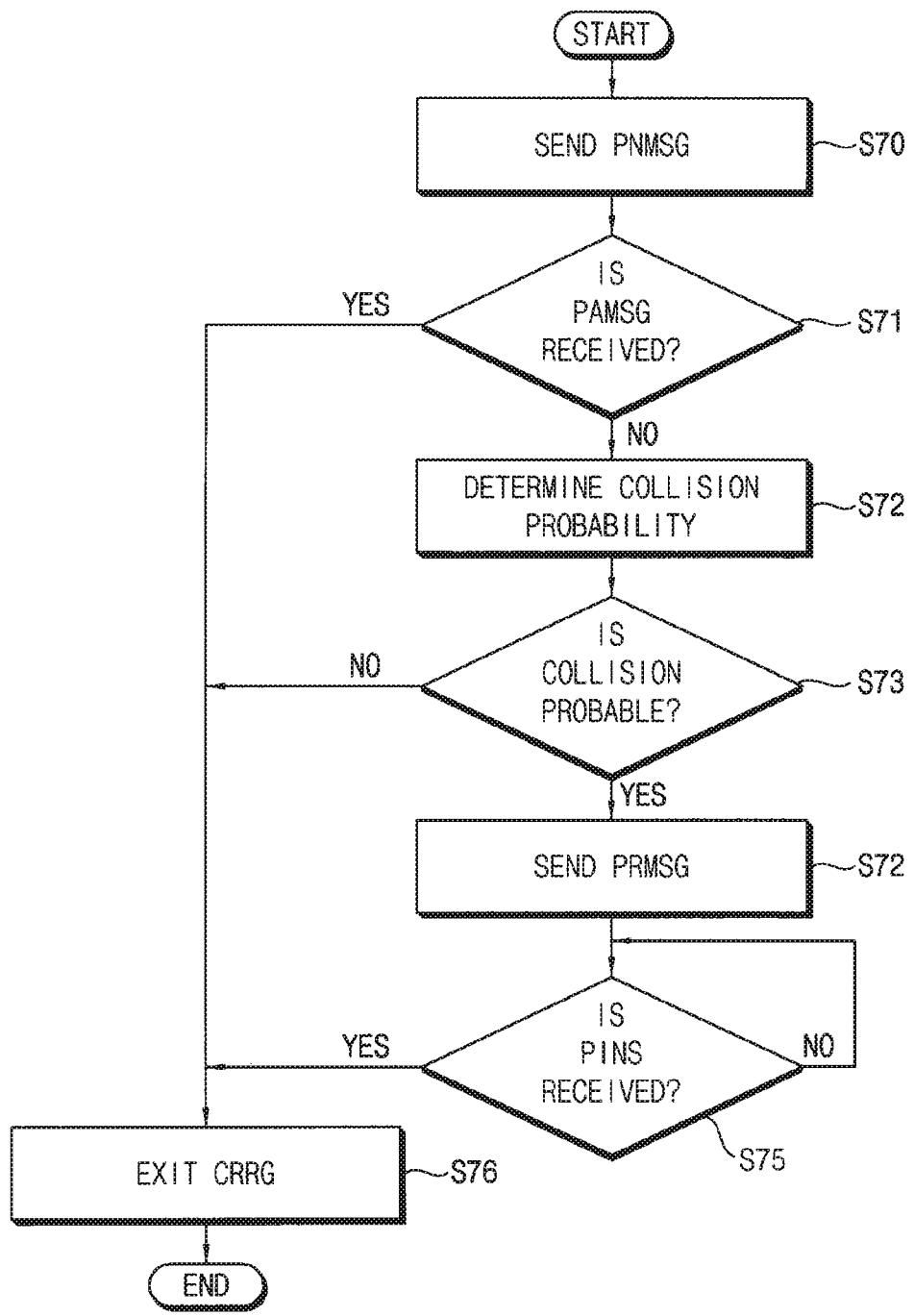
FIG. 8 is a flow chart illustrating a method of passing through a crossing position by an autonomous driving device according to an exemplary embodiment of the inventive concept.

FIG. 8 is a flow chart illustrating a method of passing through a crossing position by an autonomous driving device according to an exemplary embodiment of the inventive concept.

Referring to FIG. 8, before passing through a crossing position, an autonomous driving device determined as a master driving device sends or transmit a passage notice message PNMSG to a collision risk slave driving device that is closest to the crossing position on a driving path that is different from a driving path of the master driving device (S70). The master driving device passes through the crossing position and exits the collision risk region CRRG (S76) after receiving a passage acceptance message PAMSG from the collision risk slave driving device (S71: YES).

In the example of FIG. 2, the master driving device 101 on the first driving path PTH1 transmits the passage notice message PNMSG to the slave driving device 102 corresponding to the collision risk slave driving device closest to the crossing position CP on the second driving path PTH2. The master driving device 101 may pass through the crossing position CP and exit the collision risk region CRRG after receiving the passage acceptance message PAMSG.

When the master driving device does not receive the passage acceptance message PAMSG from the collision risk slave driving device (S71: NO), the master driving device determines a probability of collision between the master driving device and the collision risk slave driving device based on the state information message from the collision risk slave driving device (S72). The determination of the collision probability will be described below with reference to FIG. 9.

The master driving device passes through the crossing position CP when the master driving device determines that a collision is not probable. For example, the master driving device passes through the crossing position CP when the collision probability is below a predefined probability threshold.

When the master driving device determines that a collision is probable (S73: YES), the master driving device sends or transmits a passage request message PRMSG to the central controller (S72) and the master driving device may pass through the crossing position CP under control of the central controller. The master driving device does not pass through the crossing position and stands by until the master driving device receives a passage command PINS from the central controller (S75: NO).

When the master driving device receives the passage command PINS from the central controller (S75: YES), the master driving device may pass through the crossing position and exit the collision risk region CRRG (S76).

Figure 9:
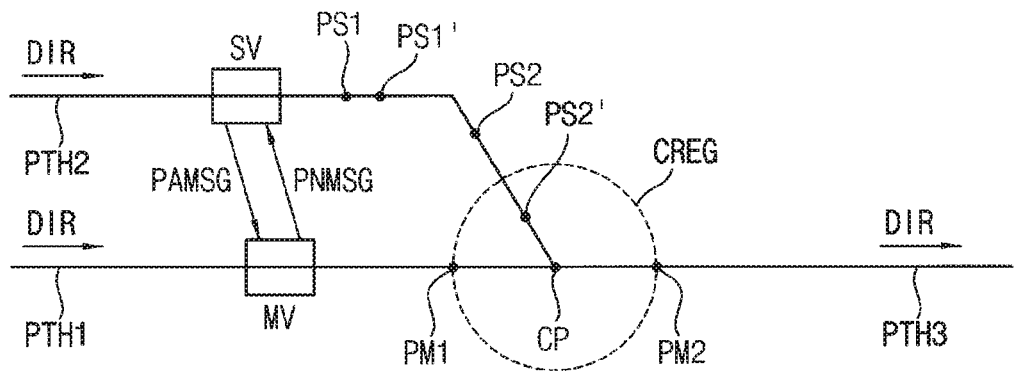
FIG. 9 is a diagram for describing a method of determining a collision probability used in the method of FIG. 8.

FIG. 9 is a diagram for describing a method of determining a collision probability used in the method of FIG. 8, according to an exemplary embodiment of the inventive concept.

FIG. 9 illustrates an example where a master driving device MV drives in a driving direction DIR along a first driving path PTH1 and a third driving path PTH3, and a collision risk slave driving device SV drives in the driving direction along a second driving path PTH2 and the third driving path PTH3.

Referring to FIG. 9, before passing through the crossing position CP, the master driving device MV on the first driving path PTH1 transmits the passage notice message PNMSG to the collision risk slave driving device SV through the local communication, and the master driving device MV may pass through the crossing position CP after receiving the passage acceptance message PAMSG from the collision risk slave driving device SV.

When the master driving device MV does not receive the passage acceptance message PAMSG from the collision risk slave driving device SV, the master driving device MV may determine the collision probability between the master driving device MV and the collision risk slave driving device SV.

In an exemplary embodiment, the master driving device MV may, based on its present position and a speed of itself, calculate a first time point t1 when the master driving device MV reaches a first position PM1 corresponding to the entrance position of a collision region CREG, and a second time point t2 when the master driving device MV reaches a second position PM2 corresponding to the exit position of the collision region CREG. Here, the collision region CREG may be set to have a range closer to the crossing position CP than the stop positions STP1 and STP2 in FIG. 2.

The speed limits of the driving paths PTH1, PTH2 and PTH3 may be determined in advance by standards, and the speed limits may be stored as the above-described path information RI by the central controller and the autonomous driving devices. Also maximum speeds of the autonomous driving devices may be determined in advance, stored and used by the central controller and the autonomous driving devices. Based on such information, the master driving device MV may calculate expected positions of the collision risk slave driving device SV at the first time point t1 and the second time point t2.

For example, the calculated positions of the collision risk slave driving device SV at the first time point t1 and the second time point t2 may be a third position PS1 and a fourth position PS2 as illustrated in FIG. 9. In this case, the master driving device MV may determine that the collision risk slave driving device SV does not enter the collision region CREG until the master driving device MV completely exits the collision region CREG, and thus the master driving device MV may pass through the crossing position CP.

In contrast, the calculated positions of the collision risk slave driving device SV at the first time point t1 and the second time point t2 may be a fifth position PS1' and a sixth position PS2' as illustrated in FIG. 9. In this case, the master driving device MV may determine that collision risk slave driving device SV enters the collision region CREG before the master driving device MV completely exit the collision region CREG, and thus the master driving device MV may determine that a collision probability is not zero. The collision probability may be calculated based on the sixth position PS2'. The master driving device MV may determine that a collision possibility does not exist or a collision is not probable if the collision probability is lower than a threshold value and then pass through the crossing position CP.

In some exemplary embodiments, the master driving device MV may determine the collision possibility based on the driving profiles of the master driving device MV and the collision risk slave driving device SV that reflect a speed change by sensing a preceding autonomous driving device on the same driving path, curvatures of the driving paths, etc. in addition to the speed limits of the driving paths and the present speeds of the autonomous driving devices.

Figure 10:
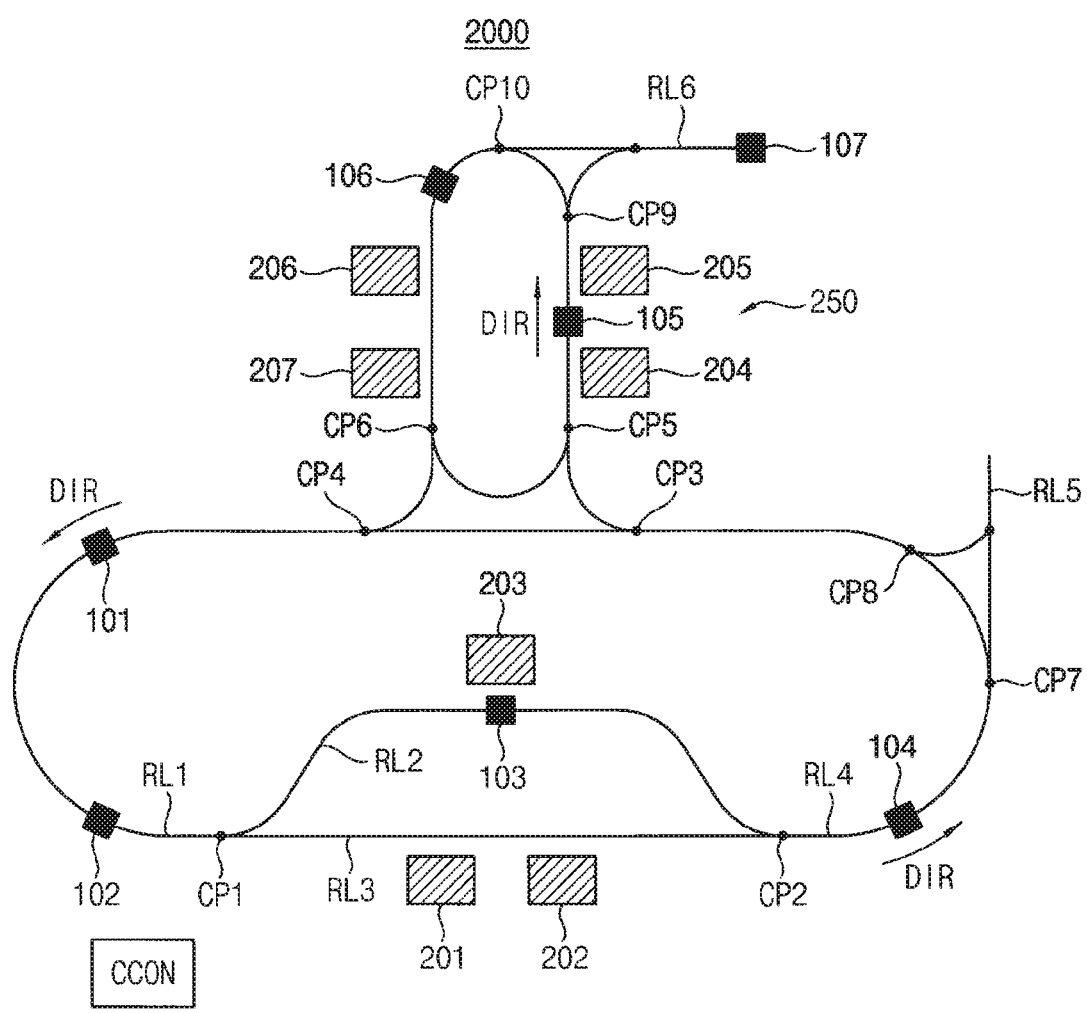
FIG. 10 is a diagram illustrating a semiconductor manufacturing facility including a driving system according to an exemplary embodiment of the inventive concept.

FIG. 10 is a diagram illustrating a semiconductor manufacturing facility including a driving system according to an exemplary embodiment of the inventive concept.

Referring to FIG. 10, a semiconductor manufacturing facility 2000 includes a central controller CCON, a plurality of rails RL1~RL6, a plurality of processing apparatuses 201~207 and a plurality of transport devices 101~107. The plurality of transport devices 101~107 correspond to a plurality of autonomous driving devices as described above, and the plurality of rails RL1~RL6 correspond to a plurality of driving paths as described above. In FIG. 10, reference numerals for some rails are omitted.

The plurality of processing apparatuses 201~207 are disposed along the plurality of rails RL1~RL6 and perform processes sequentially with respect to semiconductor wafers. The plurality of rails RL1~RL6 may be fixed at a ceiling or a floor via the plurality of processing apparatuses 201~207. The plurality of transport devices 101~107 may drive along the plurality of rails RL1~RL6 to transport articles such as the semiconductor wafers between the processing apparatuses 201~207.

Some processing apparatuses 204, 205, 206 and 207 may form a bay 250 to perform a sequence of associated processes. FIG. 10 illustrates the one bay 250 as an example and the semiconductor manufacturing facility 2000 may include a plurality of bays.

Based on driving command from the central controller CCON, each of the transport devices 101~07 may hold a wafer carrier in which the semiconductor wafers are placed, drive along the rails RL1~RL6 between the processing apparatuses 201~207, and release the wafer carrier at the processing apparatus or a storage corresponding to a destination.

The rails RL1~RL6 may include simple line portions and/or curved portions, and form crossing positions CP1~CP10 including diverging positions and a converging positions. For example, the rails RL1~RL6 may include an inter-process rail to connect bays, an in-process rail to connect apparatuses in the same bay, a diverging rail to connect the inter-process rail and the in-process rail, and so on. The rails RL5 and RL6 are shelter rails to evacuate the transport device 107, for example, which is out of order.

Figure 11:
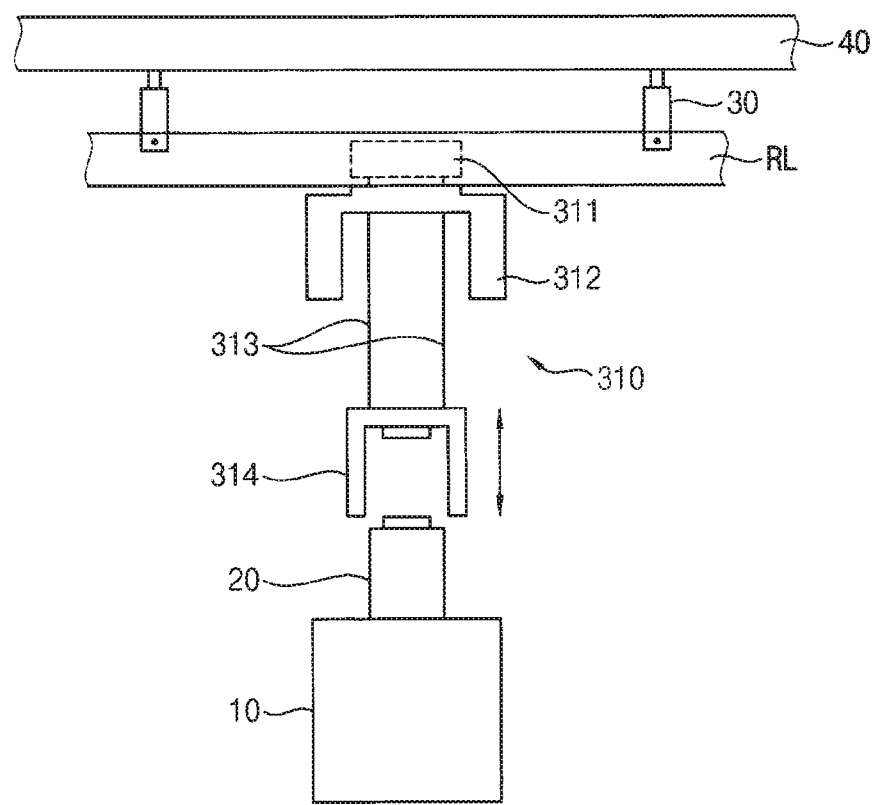
FIG. 11 is a diagram illustrating an exemplary transport device included in the semiconductor manufacturing facility of FIG. 10.

FIG. 11 is a diagram illustrating a transport device included in the semiconductor manufacturing facility of FIG. 10 according to an exemplary embodiment of the inventive concept.

Referring to FIGS. 10 and 11, a rail RL may be established at a ceiling 40 so that a transport device 310 may pass a loading station 10 of a processing apparatus. The rail RL may be fixed to the ceiling 40 by brackets 30.

The transport device 310 has a grip portion 314 that suspends and grips an article such as a wafer carrier 20 and moves vertically. When the transport device 310 stands still, the grip portion 314 may be moved vertically by feeding out or spooling wires or belts 313 to load the wafer carrier 20 from or unload the wafer carrier 20 to the loading station 10. For example, the grip portion 314 may be raised and lowered using the spooling wires or belts 313.

The loading station 10 is implemented to provide the wafer carrier 20 to and receive the wafer carrier 20 from the transport device 310.

The transport device 310 may drive along the rail RL with the grip portion 314 being located in a raised position, and to transfer the wafer carrier 20 to or from the loading station 10 by raising and lowering the grip portion 314 between the raised position and a lowered position with the transport device 310 stopped at a stop position corresponding to a transfer target station 10 among the plurality of stations 10.

The transport device 310 may include a travel drive portion 311 which travels on the rail RL, and an article support portion 312 suspended and supported by the travel drive portion 311 such that the article support portion 312 is located below the rail RL.

Although not illustrated in FIG. 11, the transport device 310 may include components as described with reference to FIG. 6 to perform and control driving and passage through a crossing position. The transport device 310 may drive along a plurality of rails forming at least one crossing position under control of the central controller CCON through the global communications GCM. When approaching close to the crossing position, the transport device 310 may selectively operate as one of the master driving device and the slave driving device based on the determination of the central controller CCON. When the transport device 310 is determined as the master driving device, the transport device 310 may control the passage through the crossing position by the other transport devices determined as the slave driving devices through the local communications LCM.

As described above, according to at least one embodiment, a driving system, an autonomous driving device and a method of preventing collision at a crossing position may be provided to reduce installation and management costs of the driving system and a facility including the driving system through the local communications between the autonomous driving devices by controlling the passages through the crossing position by the autonomous driving devices without additional hardware for preventing collisions.

Further as described above, according to at least one embodiment, a driving system, an autonomous driving device and a method of preventing collision at a crossing position may be provided to reduce the burden placed on the central controller for performing control operation because the central controller controls overall driving of autonomous driving devices and a master autonomous driving device controls passage through the crossing position.

The inventive concept may be applied to any driving system and autonomous driving devices included in a driving system. For example, the inventive concept may be applied to a semiconductor manufacturing facility for manufacturing systems and devices such as a memory card, a solid state drive (SSD), an embedded multimedia card (eMMC), a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, a wearable device, an internet of things (IoT) device, an internet of everything (IoE) device, an e-book reader, a virtual reality (VR) device, an augmented reality (AR) device, etc.

The foregoing is illustrative of exemplary embodiments of the inventive concept and is not to be construed as limiting thereof. Although a few exemplary embodiments have been described, those skilled in the art will readily appreciate that many modifications are possible in these exemplary embodiments without materially departing from the present inventive concept.

What is claimed is:

1. A driving system comprising:
a central controller external to a plurality of autonomous vehicles;
a plurality of driving paths forming a crossing position; and
the plurality of autonomous vehicles configured to drive along at least one of the driving paths through the crossing position,
wherein the central controller is configured to determine a plurality of targets from among the plurality of the autonomous vehicles that are within a collision attention region, designate one of the plurality of targets that first enters a collision risk region as a master and the others of the plurality of targets as slaves by transmitting a master grant message to the one target upon receiving a master request message from the one target, the master grant message including an identifier of the central controller, an identifier of the one target, a tag indicating approval to become the master, and device information,
wherein the master controls passage of the slaves identified in the device information through the crossing position,
wherein the collision risk region is centered on the crossing position, the collision attention region surrounds the collision risk region, and the collision attention region is wider than the collision risk region, and
wherein the one target transmits the master request message upon determining it has entered the collision risk region.

2. The driving system of claim 1, wherein the central controller stores crossing position information including information on the collision risk region and the collision attention region.

3. The driving system of claim 1, wherein the central controller transmits identifiers of the slaves to the master.

4. The driving system of claim 3, wherein each of the slaves transmits a state information message to the master, the state information message including an identifier, a present position and a present speed of the corresponding slave.

5. The driving system of claim 4, wherein the master determines a passage order through the crossing position by the master and the slaves based on the state information messages from the slaves and transmits a crossing control message including the passage order to the slaves.

6. The driving system of claim 5, wherein the state information message further includes a priority indicating a degree of driving urgency of the corresponding slave, and the master adjusts the passage order based on the priorities.

7. The driving system of claim 4, wherein the master determines a next master among the slaves and transmits a master change message to the next master when the master exits the collision risk region or the master falls out of order, and the next master operates as a new master in response to the master change message.

8. The driving system of claim 4, wherein, before passing through the crossing position, the master transmits a passage notice message to one of the slaves that is closest to the crossing position on a driving path that is different from a driving path of the master, and the master passes through the crossing position after receiving a passage acceptance message from the one slave.

9. The driving system of claim 8, wherein, when the master does not receive the passage acceptance message from the one slave, the master determines a probability of collision between the master and the one slave based on the state information message from the one slave and the master passes through the crossing position when the master determines that the probability of collision is less than a pre-defined probability threshold.

10. The driving system of claim 9, wherein, when the master determines that the probability of collision is greater than or equal the pre-defined threshold, the master transmits a passage request message to the central controller and the master passes through the crossing position under control of the central controller.

11. The driving system of claim 1, wherein when the master passes through the crossing position before the slaves, each of the slaves waits at a stop position in the collision risk region until each of the slaves is determined as a new master.

12. The driving system of claim 1, wherein, when each of the plurality of autonomous vehicles enters the collision risk region, each of the plurality of autonomous vehicles transmits a master request message requesting approval as the master to the central controller.

13. The driving system of claim 12, wherein, when the master does not exist when the central controller receives the master request message, the central controller transmits a master grant message to the autonomous vehicle that transmits the master request message.

14. The driving system of claim 13, wherein, when the master exists when the central controller receives the master request message, the central controller transmits a master reject message to one of the autonomous vehicles that transmits the master request message.

15. The driving system of claim 1, each of the plurality of autonomous vehicles further comprising:
a manual controller configured to control passage of the corresponding autonomous vehicle during a manual mode and the corresponding autonomous vehicle converts to the manual mode, when one of the slaves passes the crossing position before the master, and the corresponding autonomous vehicle in the manual mode operates under control of the manual controller.

16. The driving system of claim 1, wherein the central controller includes:
a central interface configured to perform global communications with the plurality of autonomous vehicles;
a central memory configured to store crossing position information including an identifier of the crossing position and information on the collision risk region centered on the crossing position and the collision attention region;
a central driving control unit configured to control driving of the plurality of autonomous vehicles through the global communications; and
a central crossing position control unit configured to determine one of the targets firstly entering the collision risk region as the master and determine the other targets as the slaves.

17. The driving system of claim 16, wherein each of the plurality of autonomous vehicles includes:
a device interface circuit configured to perform the global communications with the central controller and local communications with other autonomous vehicles;
a device memory configured to store the crossing position information provided from the central controller;
a device crossing position control unit configured to, when the corresponding autonomous vehicle is determined as the master, control the passage through the crossing position based on state information provided from the slaves through the local communications, and when the corresponding autonomous vehicle is determined as one of the slaves, control passage through the crossing position based on control of the master through the local communications; and
a device driving control unit configured to control driving along the plurality of driving paths under controls of the central controller and the crossing position control unit.

18. An autonomous driving device comprising:
an autonomous vehicle configured to drive along a plurality of driving paths forming a crossing position,
wherein the autonomous vehicle is configured to selectively operate as one of a master and a slave in response to receipt of a message from a central controller that is external to the autonomous vehicle, when the autonomous vehicle is within a certain range of the crossing position, and
wherein the autonomous vehicle operated as the master controls passage through the crossing position by other autonomous vehicles operated as the slave by performing local communications between the autonomous vehicle operated as the master and each of the other autonomous vehicles operated as the slave,
wherein, before passing through the crossing position, the master transmits a passage notice message to one of the autonomous vehicles operated as the slave closest to the crossing position on a driving path different from a driving path of the master, the master passes through the crossing position after receiving a passage acceptance message from the one autonomous vehicle operated as the slave, and the master passes through the crossing position after not receiving the passage acceptance message and determining that a probability of collision with the one autonomous vehicle is below a predefined probability threshold using information received in a message from the one autonomous vehicle operated as the slave indicating its present position and speed.

19. A method of preventing a collision at a crossing position of a plurality of driving paths driven by a plurality of autonomous vehicles, the method comprising:
determining, by a central controller external to the plurality of autonomous vehicles, a plurality of targets from the plurality of the autonomous vehicles that are within a collision attention region;
designating, by the central controller, one of the plurality of targets that first enters a collision risk region as a master and the others of the plurality of targets as slaves by transmitting a master grant message to the one target upon receiving a master request message from the one target, the master grant message including an identifier of the central controller, an identifier of the one target, a tag indicating approval to become the master, and device information; and
controlling, by the master, passage of the slaves identified in the device information through the crossing position,
wherein the collision risk region is centered on the crossing position, the collision attention region surrounds the collision risk region, and the collision attention region is wider than the collision risk region, and
wherein the one target transmits the master request message upon determining it has entered the collision risk region.

* * * * *